March 22, 1938. U. URBANY 2,111,954
COOKER
Filed March 14, 1936
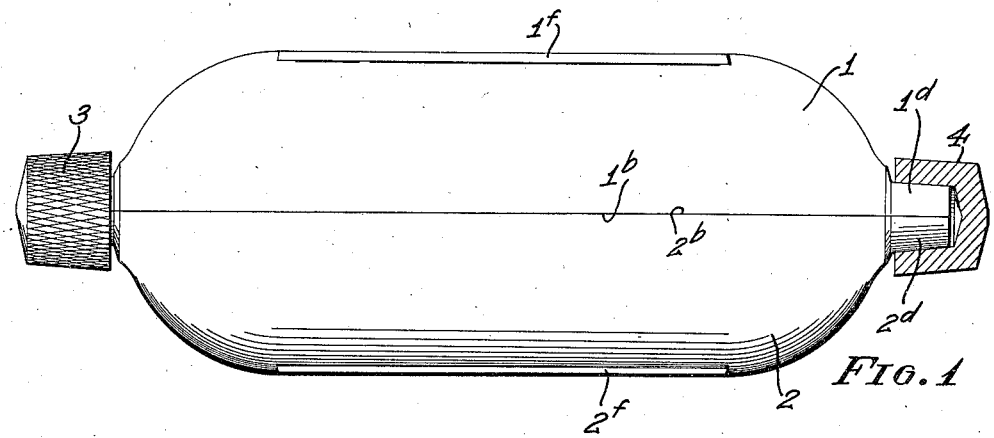
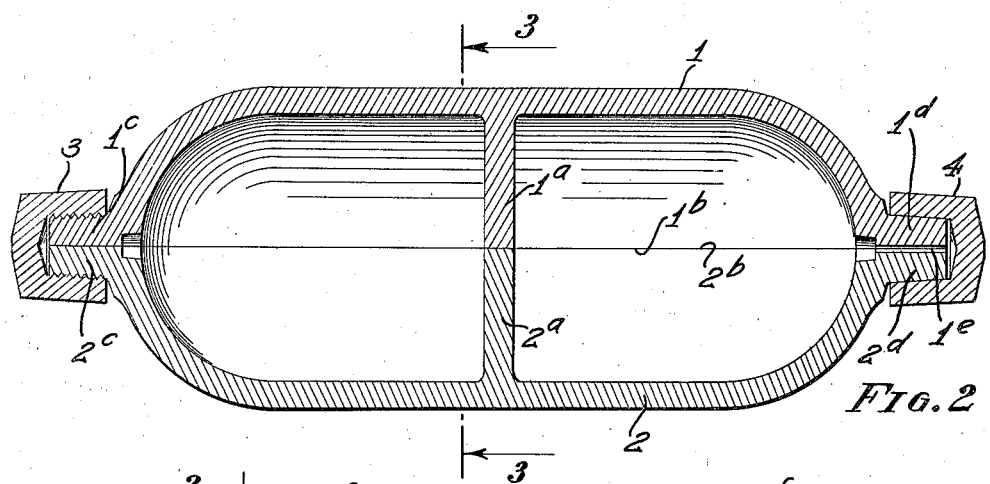
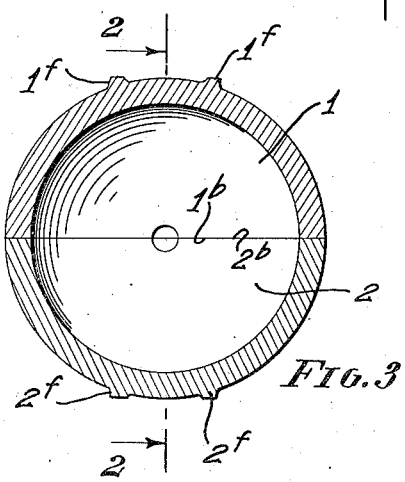
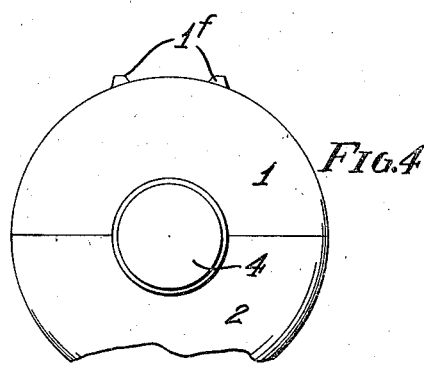
Inventor
Urban Urbany
A.B. Bowman
Attorney Patented Mar. 22, 1938

2,111,954

UNITED STATES PATENT OFFICE 2,111,954

COOKER

Urban Urbany, San Diego, Calif.

Application March 14, 1936, Serial No. 68,925

2 Claims. (Cl. 53—6)

My invention relates to cookers for cooking meats, vegetables or fruits and the objects of my invention are:

First, to provide a cooker of this class in which the food to be cooked may be placed in the separate halves of the cooker casing members and then the members readily secured together and heat applied thereto, preferably in an oven or the like for cooking foods therein;

Second, to provide a device of this class in which the food cooked therein retains substantially all of the food qualities with a minimum of loss;

Third, to provide a cooker of this class in which the food may be kept hot over a considerable period after it has finished cooking;

Fourth, to provide a cooker of this class in which different kinds of foods may be cooked in separate compartments of the cooker;

Fifth, to provide a cooker of this class with safety means in connection therewith to prevent release when the pressure becomes too high;

Sixth, to provide a cooker of this class which may be readily opened for releasing the food therein;

Seventh, to provide a cooker of this class in which the cooker may be readily opened and some of the food dished therefrom then closed again so that food remaining therein will remain heated over a considerable length of time.

Eighth, to provide a cooker of this class which is very simple and economical of construction, efficient in its action, durable, and which will not readily deteriorate or get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a side elevational view of my cooker in assembled relation all ready for use and showing one of the connecting caps in section to facilitate the illustration; Fig. 2 is a longitudinal sectional view from the line 2—2 of Fig. 3; Fig. 3 is a transverse sectional view from the line 3—3 of Fig. 2, and Fig. 4 is a fragmentary end view of the assembled cooker.

Similar characters of reference refer to similar parts and portions throughout the several views of the drawing:

The cooker casing members 1 and 2 are complementary members which are exact duplicates so that they may be made in single members, and two of these members form the two cases 1 and 2. They are provided with transverse partitions 1a and 2a and are preferably made of a non-corrosive metal such as aluminum, Monel metal or stainless steel. The body may be of any shape, though I have shown one in cylindrical form with partitions transversely across the middle and the extended ends are provided with tapered knobs 1c and 2c and 1d and 2d. The contacting sides of these members 1 and 2, including the knobs and partitions, are preferably finished at 1b and 2b so that their flat sides fit together as shown best in Fig. 2 of the drawing. The knob formed by the members 1c and 2c is screw-threaded on its outer surface and there is provided a cap 3 which is provided with a tapered internal thread adapted to screw thereon for securing the members 1c and 2c and therefore the members 1 and 2 rigidly together at the one end. This cap member 3 is preferably knurled at its outer surface to facilitate turning the same on the knob members 1c and 2c. The knob formed by the members 1d and 2d is provided with a small central orifice 1e and the outer surface is tapered and smooth, and mounted over this knob is the cap 4, which is provided with a smooth tapered recess adapted to fit tightly over the members 1d and 2d and clamp the same together as shown in Fig. 2 of the drawing. Secured on the opposite side from the open flat sides of the members 1 and 2 are ridge portions 1f and 2f which form extended surfaces so that a cooker will rest on any flat surface without rolling, with either side up.

The operation of my cooker is as follows: Meat of any kind or fowl, vegetables, or fruit may be placed in the cooker casings, then the flat open sides placed together as shown best in Fig. 2 of the drawing; then the screw-threaded cap 3 is placed over the threads on the knob formed by the members 1c and 2c and screw-threaded thereon, thus clamping the two members together at this end; then the cap 4, is placed over the opposite end; then the cooker is placed in an oven or any other heat producing chamber for cooking the contents of the cooker.

It will be noted that the cooker is made sufficiently heavy that the casing will not spring to any extent, therefore, the only losses of the juices from the food in cooking would pass between the members 1 and 2 at the joints which would happen if too much steam pressure accumulates on the inside. However, it will be noted that the orifice 1e is open to the interior through which the steam may escape, and if the pressure becomes unsafe the steam pressure will pass through the orifice *1e* and force the cap 4 from the knob formed between members *1d* and *2d*, thus permitting the members 1 and 2 to spread at this end and permit the release of the high pressure. After the food is sufficiently cooked, the cap 4 may be removed and the cap 3 unscrewed, the members 1 and 2 separated and the food removed therefrom in any desirable manner.

Though, I have shown and described a particular construction, combination and arrangement of parts and portions, I do not wish to be limited to this particular construction, combination, and arrangement, but desire to include in the scope of my invention, the construction, combination, and arrangement substantially as set forth in the appended claims.

Having thus described my invention, what I claim as new and desire to secure by Letters Patent is:

1. In a cooker, a pair of complementary cooking casing members together forming a hollow casing with extended knobs, cap means fitted over said knobs for securing said casings together, and one of said knobs being screw-threaded and the cap screw-threaded thereon and the other knob being vented and the cap slip fitted thereon.

2. In a cooker, a pair of complementary cooking casing members together forming a hollow casing with extended closed knobs, cap means fitted over said knobs for securing said casings together, one of said knobs being screw-threaded and the cap screw-threaded thereon, and one of said knobs provided with a small orifice communicating with the interior of the casing and extending through the knob and the cap thereon provided with a tapered recess adapted to fit on the tapered end of said knob.

URBAN URBANY.